No. 12,305. REISSUED JAN. 17, 1905.
W. WILLIAMS.
AIR BRAKE SYSTEM.
APPLICATION FILED NOV. 25, 1904.
3 SHEETS—SHEET 1.
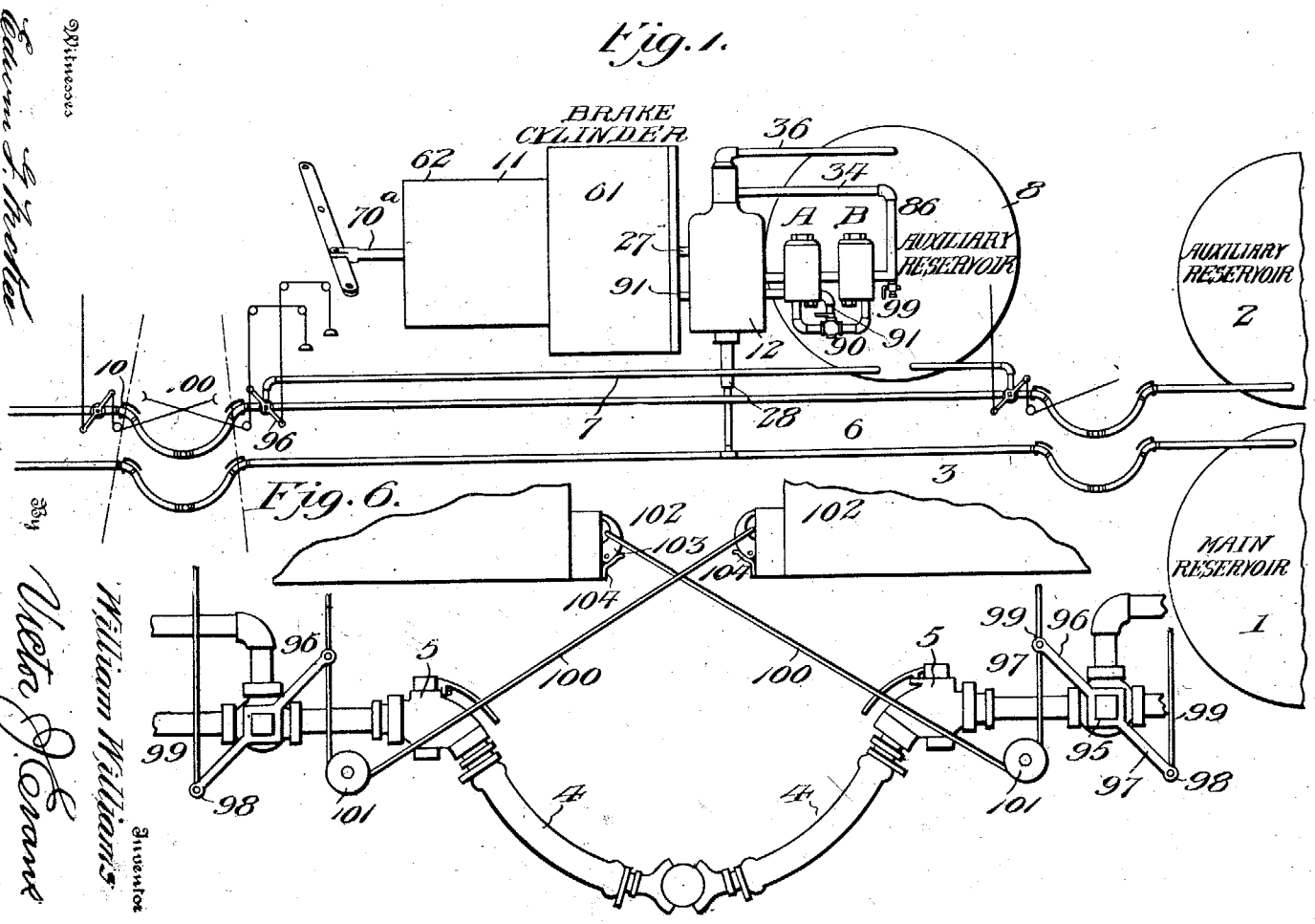
Witnesses
Edwin F. McKee
C. C. Hines.
Inventor
William Williams
By Victor J. Evans
Attorney No. 12,305. REISSUED JAN. 17, 1905.
W. WILLIAMS.
AIR BRAKE SYSTEM.
APPLICATION FILED NOV. 25, 1904.
2 SHEETS—SHEET 2
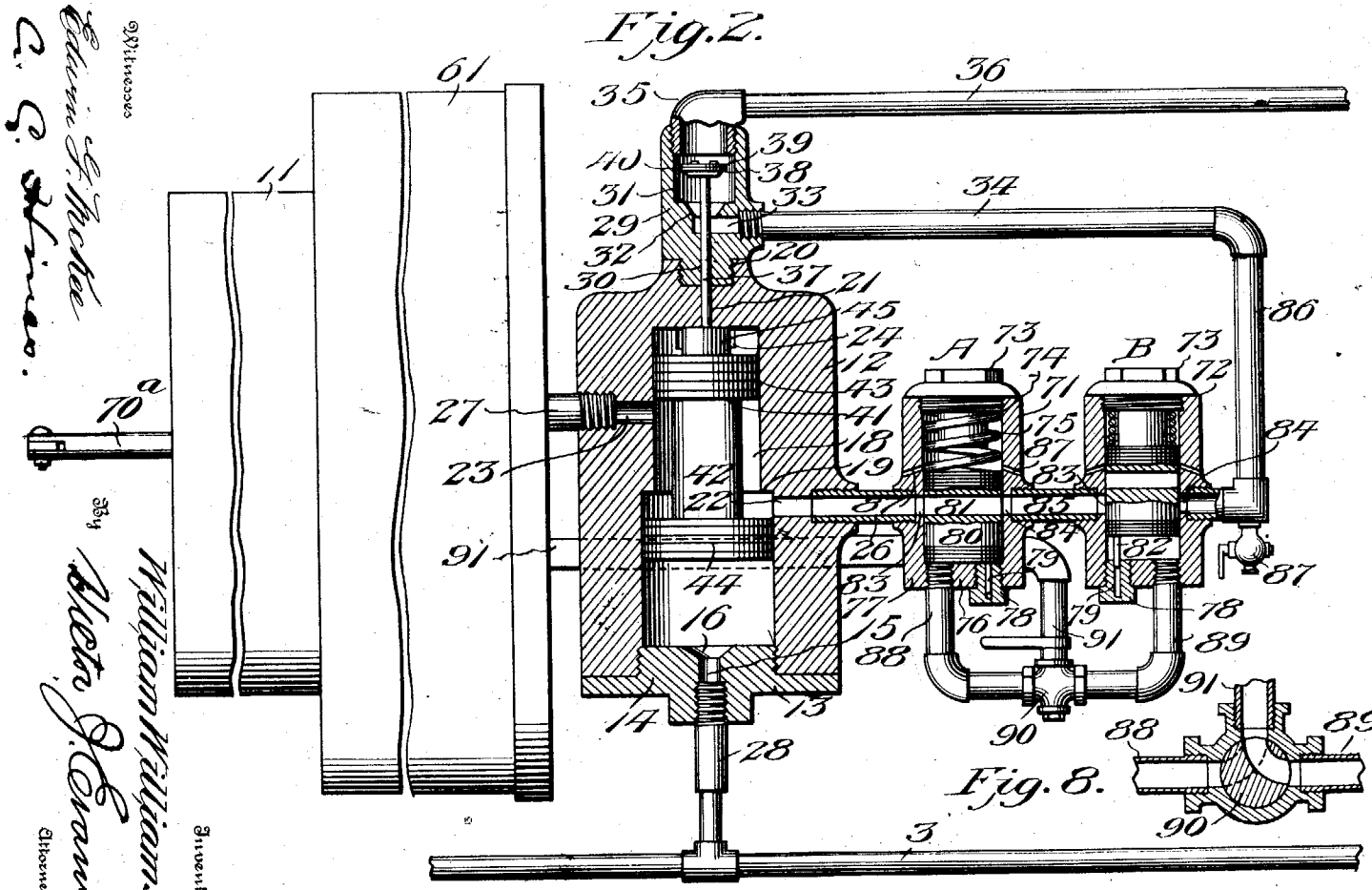
Witnesses
Edwin F. McKee
C. E. Hines.
Inventor
William Williams
By Victor J. Evans
Attorney No. 12,305. REISSUED JAN. 17, 1905.
W. WILLIAMS.
AIR BRAKE SYSTEM.
APPLICATION FILED NOV. 25, 1904.
3 SHEETS—SHEET 3.
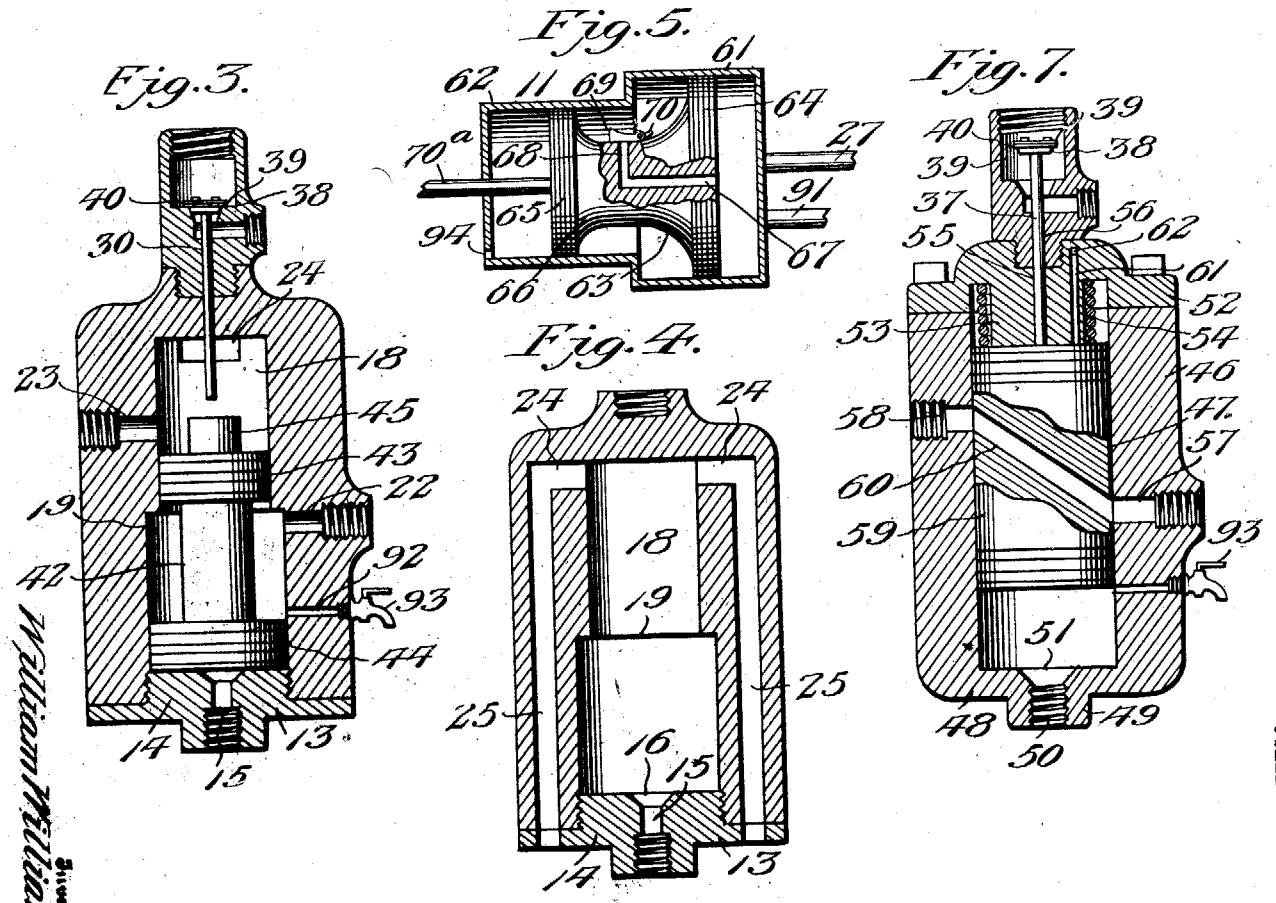
Inventor
William Williams
Witnesses
Edwin L. McKee
C. C. Hines
By Victor J. Evans
Attorney No. 12,305. Reissued January 17, 1905.

UNITED STATES PATENT OFFICE.

WILLIAM WILLIAMS, OF HUNTINGDON, PENNSYLVANIA.

AIR-BRAKE SYSTEM.

SPECIFICATION forming part of Reissued Letters Patent No. 12,305, dated January 17, 1905.

Original No. 766,088, dated July 26, 1904. Application for reissue filed November 25, 1904. Serial No. 234,304.

*To all whom it may concern:*

Be it known that I, WILLIAM WILLIAMS, a citizen of the United States, residing at Huntingdon, in the county of Huntingdon and State of Pennsylvania, have invented new and useful Improvements in Air-Brake Systems, of which the following is a specification.

This invention relates to an air-brake system of that class known as "direct" or "straight" air, and embodies pneumatically-controlled means for effecting the prompt application and release of brakes by an engineer, conductor, or other trainman.

In order that the result sought may be clearly apparent to those skilled in the art, it may be well to state by way of premise that the adoption of the present "indirect" system of air-brakes, depending upon the escape of air from the train-line to effect the application of of brakes, was necessary principally for the reason that efforts made to obtain a prompt application and release of the brakes in straight-air systems wherein the pressure in the train-pipe was utilized to effect the application of the brakes were unsuccessful. The direct or straight air system is simpler than the indirect system and is more reliable in action; but the lack of effective provision for the prompt release of the brakes has led to the disuse of the straight-air and the adoption of the indirect system, a common example of the latter being the Westinghouse system.

Broadly stated, the invention contemplates the use of a primary reservoir, an auxiliary reservoir, a brake-cylinder, and a novel main valve, controlling by its operation the admission of air from the auxiliary reservoir to the brake-cylinder, the main valve by its movement establishing a means of communication therethrough or thereabout between the brake-cylinder and the auxiliary reservoir or other storage-receptacle and also serving as a means of exhaust when the brakes are released.

The invention further contemplates the provision of a primary reservoir, an auxiliary or secondary reservoir or storage-receptacle, a brake-cylinder, and automatically-operating gravitating valve mechanism interposed between the auxiliary or secondary reservoir and the brake-cylinder and connected both to the latter and the primary reservoir.

The invention further contemplates the use of a primary reservoir, an auxiliary reservoir, a brake-cylinder, a main valve connected to the primary reservoir and brake-cylinder, and a secondary valve operative to open position by the main valve and interposed between the latter and the auxiliary reservoir.

The invention further consists in the use of main valve mechanism in connection with air-storage devices and a brake-cylinder wherein the movable valve elements are returned on release of the brakes to normal position by gravitating movement and air impact directly thereagainst and wherein springs are absent, except possibly to effect a slight cushioning operation.

The invention further consists in the preferred use of a brake-cylinder having a piston therein which is returned to normal position after release of the brakes by air-pressure established during its operation to set the brakes and without the assistance or use of a spring.

The invention still further consists in the general organization of contributing elements, as well as the details, which will be more fully hereinafter set forth.

The objects and advantages of the present form of direct or straight air brakes are manifold, and, among others, may be particularly mentioned the instantaneous release of the brakes by permitting all air within the brake-cylinder to exhaust quickly without the usual hissing incident to a gradual exhaust whenever the pressure in the train-pipe is relieved, the provision for positively and rapidly applying the brakes by the use of direct or straight air pressure, and maintaining the pressure in the auxiliary cylinder or other storage-receptacle at a point greatly in excess of the pressure required for the application of the brakes and completely controlling the application of the air at a degree of pressure lower than a maximum pressure and proportionate to the weight and loaded condition of the car or series of cars composing a train.

In the drawings, Figure 1 is a diagrammatic view including train and feeding pipes and their connections, a brake-cylinder, reservoirs, and valve mechanism embodying the features of the invention. Fig. 2 is a sectional elevation of the valve mechanism, connections therefor, and a portion of the brake-cylinder, showing the said mechanism in position for feeding air to the brake-cylinder. Fig. 3 is a transverse vertical section through the main valve mechanism, illustrating the piston in its normal or lowered position. Fig. 4 is a transverse vertical section through the casing of the main valve mechanism, taken in a plane at right angles to that illustrated by Fig. 3 to show the exhaust passages or ports. Fig. 5 is a vertical longitudinal section through the preferred form of brake-cylinder, showing the piston therein partially broken away. Fig. 6 is a transverse vertical section of the modified form of the main valve. Fig. 7 is a detail sectional view of the two-way valve.

Similar numerals of reference are employed to indicate corresponding parts in the several views.

The improved system includes a main reservoir 1, an auxiliary reservoir 2, both of which may be connected, as usual, to a pump on an engine and controlled as to supply and release of air thereto and therefrom by the ordinary engineer's valve, and extending from the reservoir 1 is a train-pipe 3, provided with the usual hose connections 4 and couplings, as well as cut-off valves 5. From the auxiliary reservoir 2 a service-pipe 6 extends and is connected, as usual, by a branch 7 with an auxiliary reservoir 8, forming a part of the brake complement of each car, all of the reservoirs 8 of the cars comprised in a train being in communication through the medium of hose connections 4, coupled at the ends of the cars and provided with cut-off valves 10, similar to those set forth in connection with the train-pipe 3. Operating in conjunction with each auxiliary reservoir 8 is a brake-cylinder 11, and between the said reservoir and cylinder main valve mechanism is interposed and operative, as will be hereinafter specified, without the addition of other mechanism, also more fully hereinafter set forth. Two forms of the main valve mechanism are shown in the accompanying drawings; but each embodies the same principle of operation, and the preferred form, as shown by Figs. 2, 3, and 4, comprises a vertically-disposed casing 12, having a lower cap 13 threaded thereinto and provided with a central upwardly-projecting seat extension 14, having a port 15 bored therethrough and terminating at its upper extremity in an enlargement or cavity 16, which reduces the upper contacting surface of the seat for a purpose which will presently appear. The casing 12 has an axial bore formed therein, varying in diameter throughout its length to provide a lower enlarged chamber 17 and an upper reduced chamber 18, between which a circumferential shoulder 19 is produced. The upper end of the casing is practically closed and has a central screw-socket 20 and a central reduced upper bore 21. At opposite points ports 22 and 23 are formed in the side wall of the casing at different elevations, the port 22 communicating with the upper portion of the chamber 17 and the port 23 with the intermediate portion of the chamber 18, and at the upper terminals of the latter chamber opposite exhaust ports or openings 24 are formed and continue or lead into exhaust-passages 25, which open outwardly or to the exterior through the lower end of the casing and the cap 13. The exhaust-passages 25 are disposed in the casing 12 in planes at right angles to the plane of the ports 22 and 23, and the ports 24 are positioned as set forth to overcome any possibility of escape of the air entering the casing to the exterior before the brakes have been applied and previous to release. The port 22 has a tubular connection 26 threaded thereinto and communicating with or connected to the reservoir 8, and threaded into the port 23 is a tubular connection 27, which is also attached to the brake-cylinder 11. Threaded into the port 15 of the cap 13 is a tubular connection 28, which is also attached to the train-pipe 3. Secured in the socket 20 is a supplemental valve inclosure 29, having a bore 30 through the center of the lower end thereof in coincidence with the bore 21. The inclosure 29 is interiorly formed with a chamber 31, having a lower valve-seat and opening 32, communicating with an outlet-port 33, projecting through the side of the lower portion of the inclosure, and in the end of said port 33 one terminal of an air-supply pipe 34 is threaded and indirectly attached at its opposite extremity to the tubular connection 25, as clearly shown by Fig. 2. A suitable union 35 is secured in the upper end of the inclosure 29, and therefrom a feed-pipe 36 extends to the upper portion of the auxiliary reservoir 8. Vertically movable in the coinciding bores 21 and 30 is a valve-stem 37 of such length that when in its lowermost position it will depend into the upper extremity of the bore in the casing 12. On the upper end of the stem a valve is secured and comprises a lower plate 38, shaped to snugly fit in the opening 32 and between which and a top plate 39 a leather or other flexible flap 40 is firmly secured by bolts passing through the plates and flaps. The maximum diameter of the lower plate 38 is less than the diameter of the flap 40, so that the perimeter of the latter may closely engage the lower wall of the chamber 31 around the opening 32. For convenience in assembling the valve and stem 37 the upper end of the latter is threaded into the valve, and the bolts connecting the plates will be located in such manner relatively to the valve-stem as to prevent turning of the plates and flap. When the stem 37 is pushed upwardly, the valve carried thereby is thrown away from or elevated above the opening 32, and the bearing for the stem 37, provided by the coinciding bores 21 and 30, is of such length as to give the stem and its valve a stable support and always cause the valve to accurately return to its seat.

Within the casing 12 a piston-valve 41 is arranged for free movement and uncontrolled by a retractile spring. This valve consists of an intermediate body 42 of less diameter than the smaller chamber 18 and has a head 43 on one end of a diameter equal to that of the chamber 18 and a head 44 on the opposite end having a diameter equal to that of the chamber 17. The two heads 43 and 44 snugly bear against the walls of the two chambers and are provided with packing-rings to establish an air-tight engagement thereof with the said walls. It will be observed that the areas of the lower side of the head 44 and the upper end of the seat extension 14 differentiate by reason of the formation of the cavity 16, and the purpose of such construction is to obviate the formation of a resisting-cushion between the head 44 and the seat extension 14, and thereby overcome any tendency toward the unrestricted return or gravitation of the piston-valve to its normal lower position. The head 43 has a central projection 45 to engage the valve-stem 37, the length of the stem upstanding in the casing 12 when said stem is in its lowermost position, the extent of the projection being properly proportioned to cause a reliable operation of the valve-stem by the piston in applying the brakes and at a time when the ports 22 and 23 will be open to each other through the bore of the casing 12 around the body 42.

The brake mechanism as thus far described may be operated with straight air without any further additions, and, as will hereinafter appear, the mechanism or controlling elements introduced between the pipe 34 and the connection 26 can be adjusted or arranged to have the air flow unrestrictedly from the pipe 34 into the connection 26. It will be understood that the piston-valve and the valve-stem 37, with its valve, form primary and secondary valve mechanisms, the secondary valve mechanism being moved into open position by the operation of the primary valve mechanism to establish air communication from the auxiliary reservoir 8 through the primary valve mechanism with the brake-cylinder. Both the primary and secondary valve mechanisms have a gravitating movement and are not controlled in their operation by springs or other unreliable attachments; but, on the contrary, the air employed in setting the brakes is utilized to return the said valve mechanisms to normal closed position after a release of the brakes is effected. It will also be noted that the outlet-port 23 is materially larger than the inlet-port 22, and when the piston-valve 41 is in position to establish communication between the said ports through the bore of the casing 12 the upper portion of the port 23 will be located comparatively close to the lower end of the head 43, and the projection 45 will then be at its full height and the exhaust-ports 24 shut out from communication with the ports 23. When the piston-valve 41 moves upwardly in the casing to establish communication between the ports 22 and 23, the air is held between the two heads, so that when the brakes are released the said piston-valve will be given a downward initial impulse sufficient to overcome any air resistance and cause the said piston-valve to quickly operate to establish communication of the port 23 with the exhaust-ports 24. The relative proportions of the primary and secondary valve mechanism and the corresponding positions of the ports 22 and 23 to effect an accuracy in operation, as well as a quick response when the air is both applied and shut off to respectively set and release the brakes, are more clearly defined by Fig. 3, which shows the valve mechanism in normal or closed position, and every precaution has been taken to insure a positive operation both in applying the air and shutting off the same without depending upon the use of springs or other unreliable retractile means.

In applying the brakes by the system thus far described the engineer or other trainman opens the valve in connection with the train-pipe 3 and the air enters the lower end of the casing 12, and immediately the piston-valve 41 is raised or pushed upwardly and the projection 45 contacts with the lower end of the stem 37 and lifts the valve on the latter to clear the opening 32, and thus permit air to pass from the auxiliary 8, through the pipe 36, inclosure 29, and pipe 34, to the connection 26 and through the bore of the valve-casing around the reduced body 42 of the piston-valve 41, which will then be in position to establish communication between the ports 22 and 23. The air passes through the outlet-port 23 into the brake-cylinder 11 and operates the piston in the latter to set the brakes, as will be readily understood. When the train-pipe 3 is relieved of air by closing the engineer's valve, the piston-valve 41 will immediately gravitate to normal position in view of the increased dimensions of the head 44 relatively to the head 43, and this gravitating movement of the piston-valve will be facilitated by the air between the heads exerting a downward pressure on the head 44, this air-pressure between the heads being maintained as long as the valve on the stem 37 is elevated above its seat, and though the descent of the piston-valve is instantaneous the air-pressure between the heads 43 and 44 is fully exerted until the head 43 shall have descended low enough to permit the valve on the stem 37 to be forced to its seat, and at such times the lower head 44 will be in contact with the top surface of the seat extension 14 and the head 43 will be below the port 23. As soon as the head 43 lowers below the port 23 the brake-cylinder is quickly exhausted through the ports 24 and all air from the brake-cylinder will immediately escape without the usual hissing incident to a gradual exhaust. This rapid exhaust will result in the return to normal position of the piston within the brake-cylinder and a release of the brake-shoes from the car-wheels without the least delay. When the piston-valve descends and permits the stem 37 to lower, the latter and its valve are rapidly forced down by the pressure of air on the latter valve coming through pipe 36 from the auxiliary reservoir. The air exerting a downward pressure on the flap 40 will cause said flap to be tightly pressed against the bottom wall of the chamber 31 around the opening 32 and prevent any leakage whatever through the said opening.

Fig. 6 shows a modified form of the main valve, which consists of a casing 46, having an axial bore 47 of equal diameter throughout its length. The bottom 48 of the casing has a central enlargement 49 with a screw-threaded opening 50 extending therethrough and provided with an upper enlargement or cavity 51 similar to the cavity 16, heretofore described. On the upper end of the casing 46 a cap 52 is secured and supports a secondary-valve inclosure similar to the inclosure 29, heretofore described, and having the same reference-numerals applied thereto. A stop 53 is formed with the cap 52 and projects downwardly into the bore 47, and surrounding the said stop is a buffer-spring 54. The secondary valve in this instance is similar to that heretofore described, and the stem 37 is movably positioned in coinciding bores 55 and 56, extending centrally through the stop 53 and in the lower portion of the valve-inclosure 29, the stem 37 having a valve on the upper end thereof of a construction heretofore fully set forth and coöperating with the lower seat to control the passage of air from an auxiliary chamber eventually through the main valve. At opposite points the casing 46 has air inlet and outlet ports (respectively designated by the numerals 57 and 58) and which will be connected up similar to the main valve. (Shown by Fig. 2.) Mounted to freely move in the bore 47 is a piston-valve 59, snugly fitting against the wall of the bore and having suitable packing-rings at opposite ends to insure the formation of an air-tight structure. The valve 59 is pierced by an inclined diametrical port 60, which when the valve is at one limit of its movement establishes communication between the ports 57 and 58 and permits the air from the auxiliary reservoir to escape through the port 58 to the interior of the brake-cylinder for the purpose of actuating the piston in the latter. When the piston-valve 59 is in normal position, the port 60 will have its opposite extremities, respectively, below the ports 57 and 58, and air communication will thereby be shut off from the said ports. The buffer-spring 54 prevents the valve from pounding against the stop 53 and also acts in a measure to force the valve downwardly when the air-pressure is relieved from the lower end of the valve by shutting off the air in the train-pipe. To maintain the valve 59 in true position in the casing, so that the opposite extremities of the port 60 will always accurately register with the ports 57 and 58, a guide-rod 61 extends upwardly from the valve and moves in a guide-bore 62 in the stop 53 and cap 52 to one side of the bore 55. The operation of this modified form of the valve is similar to that heretofore described, with the exception that the air does not come as full into the operation of receding or returning the valve to normal position.

Another important feature in the improved brake system is the absence of spring mechanism in the brake-cylinder and the replacement of such mechanism for returning the piston to normal position when the brakes are released by air-pressure so disposed during the movement of the piston in applying the brakes that it will automatically operate on the release of the brakes to return the piston to normal position. The brake-cylinder 11 is formed with an enlarged member 61 and a smaller member 62, and therein is slidably mounted a piston 63, having an enlarged head 64, movable in the member 61, and a smaller head 65, movable in the member 62, the heads being connected by an intermediate reduced body 66 to provide a chamber between the heads 64 and 65. Opening through the head 64 is a passage 69, having an angular branch 68 opening out through the body 66 between the heads 64 and 65, the outlet of the branch 68 being covered by a gravitating valve 69 with a weighted free end and a stop 70 adjacent to its pivotal point to obstruct any tendency to overthrow of the same. When air is applied to set the brakes and enters the brake-cylinder, it forces the piston 63 forwardly to actuate a piston-rod 70*, connected to the brake-lever, as will be readily understood. During the forward movement of the piston a part of the air will enter the chamber formed around the body of the piston between the heads 64 and 65, and this entrance of the air into the chamber confined between the piston-heads will continue until an equilibrium of pressure is instituted in the space between the heads of the piston and in the enlarged member 61 of the cylinder. It will be understood that the piston is moving forward during this operation and that the passage of the air into the space or chamber formed between the piston-heads does not in the least detract from the operation of the piston as an entirety by reason of the greater area of the head 64 providing an increased air-impacting surface. When the brakes are released or the air shut off from the train-pipe and the air behind the head 64 exhausts, the pressure of the air within the space or chamber between the heads 64 and 65 will become effective against the front side of the head 64 and force the piston rearwardly to normal position and immediately release the brake-shoes from the car-wheels.

Another important feature of the invention resides in the provision of means for supplying air to the brake-cylinder at pressure much lower than in the auxiliary reservoir or other receptacle, so that the air may be stored at an abnormally-high pressure and reduced in transit to the brake-cylinder, so that a determined standard pressure, which may be termed the "maximum," and a pressure less than the maximum may be exerted on the said cylinder. It is well known that cars in loaded condition or varying in weight should have a different braking pressure used in connection therewith. In other words, in a train to be made up of loaded and light cars the braking pressure necessary for use on the loaded cars would be injurious on the light cars and produce what is known as "flat" wheels and otherwise strain and injure the light-car structure. Means are therefore included in the improved system for equalizing the air-pressure and applying it proportionately to the weight of the car and comprises two valve-casings 71 and 72, each having a screw-cap 73 with a depending stop 74, surrounded by a spring 75, which is securely held in place. The bottom of each casing is closed by a screw-plate or bottom cap 76, having a threaded opening 77 at one side of the center thereof and a guide-plug 78 at a diametrical point formed with a vertical guide-socket 79. Within each casing is mounted a freely-movable piston 80, having a bore 81 extending diametrically therethrough and provided with packing-rings at the ends to insure an air-tight engagement thereof with the interior of the casing or valve-chamber wall. Depending from the lower end of the piston 80 is a guide pin or rod 82, which freely slides in the socket 79 and maintains the piston in true position to hold the bore 81 in constant coinciding relation with opposite ports 83 and 84 in the casing 71. The upper end of the piston bears against the lower extremity of the spring 75, and the piston is normally down, so that the bore 81 thereof is in alinement or coincides with the ports 83 and 84. As before indicated, the structure in both valve-casings 71 and 72 is precisely the same; but the springs therein are of different tension, so that the valve-casing and its parts nearest the main or controlling valve casing 12 and designated by the letter A is set for maximum pressure and the remaining valve B is adjusted for a pressure below the maximum. The maximum valve mechanism A is attached to the casing 12 by the tubular connection 26, which coincides with the port 83, and both valve-casings are rendered communicating by an intermediate tubular connection 85. The port 84 of the valve mechanism B has a pipe 86 attached thereto and running to the pipe 34, and secured to the lower elbow of the pipe 86 is a test-cock 87, which may also be used, if found necessary, to relieve the pipe 86 and parts intimate therewith of water of condensation. Each of the valve-casings 71 and 72 has a pair of drain-ports 87 at diametrically opposite points thereof and incline downwardly, the inner highest terminals of the said drain-ports being above the upper end of the piston 80 when the latter is in its lower normal position. These drain-ports 87 may also serve at times to relieve the valve-casings of air that might accumulate to a limited extent above the pistons; but this service is secondary in view of the advantages of drainage of moisture from the interior of the casings. Connected to the bottom cap 76 and engaging the threaded opening 77 are pipes 88 and 89, one for each casing, and run and are attached to any suitable two-way valve 90, from which a pipe 91 also extends to the rear end of the brake-cylinder 11, or that end of the cylinder adjacent to the enlarged head 64 of the cylinder-piston. The two-way valve establishes communication with one or both of the pressure regulating or controlling valve mechanisms and the brake-cylinder, or both valve mechanisms may be thrown out of communication with the brake-cylinder by a further movement or adjustment of the two-way valve 90. When the valve mechanisms A and B are thrown out of communication relatively to the brake-cylinder, the pistons 80 thereof are in normal position and the bores 81 are in alinement with the connections 26 85 and the pipe 86, so that the air when permitted to do so will flow directly through the pistons 80 into the main valve-casing 12. Each car will be equipped with the mechanism shown by Fig. 2 in addition to the usual auxiliary reservoir, and by this means the brake-pressure can be regulated proportionately to the weight of the car, and, furthermore, if the brakes are set for operation by a maximum pressure, say, of forty-five pounds and the pressure in the brake-cylinder exceeds such maximum the piston in the maximum valve mechanism A will be forced upwardly and shut off the flow of air until the release is effected. This will avoid injury to the car-wheels and other car structures or parts; but the most important advantage of the air-pressure equalizing or controlling mechanism set forth is the provision for applying a braking pressure proportionate to the weight of the car, whether it be loaded or light. The valve mechanism B will come into active part in carrying out this advantage and the spring 75 thereof will be set for a pressure below that of the spring in the valve mechanism A—or, say, twenty pounds—to accommodate a light car, and in this event the valve mechanism A will be shut out of communication with the brake-cylinder and the valve mechanism B remain alone in communication with such cylinder. Under these conditions the light cars in a train having the valve mechanism B in communication with the brake-cylinder will operate to regulate the braking pressure or hold the pressure of the air down to twenty pounds braking force without interfering with the maximum braking pressure that may be required in other loaded cars in the same train, and on these latter cars the valve mechanism A will be in sole communication with the brake-cylinders. It will be seen in the operation of these regulating valve mechanisms that the air will flow back from the brake-cylinder through the pipe 91 to the two-way valve 90 and through the latter be directed to either of the mechanisms A or B that may be in communication with the said cylinder. As soon as the maximum pressure in the brake-cylinder is overreached or the maximum or less than the maximum pressure for which the valve mechanism B may be set is obtained the piston 80 will rise against the resistance of the spring and check the flow of air, as will be readily understood.

As a convenient attachment the main valves in both forms shown will have drain-bores 92 formed therein at a suitable elevation above the bottoms of the bores therein, and connected with said bores are drain-cocks 93, each main valve having a single bore and cock. The reduced member 62 of the brake-cylinder will also have an opening 94 formed in the lower portion of the forward end thereof to permit water of condensation to pass outwardly therefrom.

In some instances it is proposed to have each car-reservoir capable of receiving the necessary air-pressure from a common storage source that may be filled at intervals or at stations where the engine takes water or coal. For this purpose the reservoirs will be equipped with supply cocks or nozzles, to which air-conveying pipes may be attached and air stored in these reservoirs which will have a pressure far in excess of that required in applying brakes. This mode of storing and supplying air from a common source is made possible in the present system by the use of the air-pressure controlling or equalizing valves A and B, in view of the fact that said valves will automatically regulate the air-pressure applied and keep it within the determined maximum or reduce the pressure to accommodate a light car.

Having thus described the invention, what is claimed as new is—

1. In an air-brake system, the combination with a main reservoir, a train-pipe, an auxiliary reservoir, and a brake-cylinder, of a controlling-valve located in the line of communication between the auxiliary reservoir and brake-cylinder, means for leading air from the train-pipe to open the valve, a pipe extending from the auxiliary reservoir to a part of the controlling-valve, and a secondary valve operative to open position by the movement of the controlling-valve to establish air communication with the latter from the auxiliary reservoir.

2. In a brake system, the combination with a reservoir and a brake-cylinder, of a controlling-valve, a secondary valve operative to open position by the movement of the controlling-valve to establish air communication between the latter and the reservoir, and means for directing a fluid-pressure alternately against the opposite ends of the controlling-valve.

3. In a brake system, the combination with a reservoir and a brake-cylinder, of a controlling-valve casing provided with inlet and outlet ports located at different distances from the end of the casing and leading, respectively, by connections, to the reservoir and brake-cylinder, a valve movable in the casing to establish communication between said ports, the casing also having an exhaust means at its upper extremity above the valve, and a secondary valve operative to open position by the valve in the said casing to establish air communication between the reservoir and brake-cylinder through the casing whereby air will be admitted from the interior of the brake-cylinder to the upper end of the controlling-valve casing just prior to the opening of the exhaust-port to drive the controlling-valve quickly to its closed position and thereby effect an instantaneous exhaust.

4. In an air-brake system, the combination with a reservoir, a brake-cylinder, and a train-pipe, of a controlling-valve casing provided with exhaust-ports communicating at the lower terminals with the atmosphere through the bottom of the casing and at their upper terminals with the upper part of the interior of said casing, means of communication between the opposite ends of the controlling-valve respectively with the brake-cylinder and the train-pipe, the said casing also having communication at an intermediate point with the reservoir, and a controlling-valve within said casing disposed in one position to establish communication between the reservoir and brake-cylinder and in another position to provide communication between the brake-cylinder and the exhaust-ports, the said controlling-valve having heads at opposite extremities and an intermediate passage means.

5. In an air-brake system, the combination with a reservoir, and a brake-cylinder, of an intermediate controlling-valve casing, a valve therein, and a compression-chamber located in the upper end of the casing, said casing being provided with inlet and outlet ports, the upper end of the valve in the open position thereof being located slightly above the upper edge of the outlet-port, whereby the initial retractile movement of the valve will be effected through the medium of the air in the compression-chamber and continued movement thereof by fluid-pressure supplied by the air escaping back into the casing from the brake-cylinder.

6. In an air-brake system, the combination with a reservoir, and a brake-cylinder, of an intermediate controlling-valve casing, a valve therein, and a compression-chamber located in the upper end of the casing, said casing being provided with inlet and outlet ports, and said valve by its movement establishing communication between the ports, the upper end of the valve in the open position thereof being located above the upper edge of the outlet-port, whereby the retractile movement of the valve will be effected through the medium of the air in the compression-chamber and continued movement thereof by fluid-pressure applied by the air escaping back into the casing from the brake-cylinder, the casing having exhaust-ports located in position to be opened at a time subsequent to the admission of the air from the brake-cylinder to the upper end of the valve-casing.

7. In an air-brake system, the combination with an auxiliary reservoir and a brake-cylinder, of a controlling-valve casing in the line of communication between the reservoir and cylinder, said casing being provided with inlet and outlet ports located out of alinement and with exhaust-ports, a reciprocating valve in said casing having intermediate means for establishing communication between the said inlet and outlet ports, means for admitting air under pressure to one end of the casing to move the valve to its open position, and means for supplying air to the casing from the auxiliary reservoir operated by the said valve.

8. In a brake system, the combination with a reservoir and a brake-cylinder, of a controlling-valve casing having inlet and outlet ports at different distances from its ends and exhaust-ports communicating with the upper portion of the interior thereof, the inlet and outlet ports being in communication respectively with the reservoir and brake-cylinder, and a controlling-valve within the said casing having heads at opposite extremities and intermediate passage means to establish communication between the inlet and outlet ports.

9. In a brake system, the combination with a reservoir, a brake-cylinder, and an intermediate controlling-valve casing, of a pipe connection between the valve-casing and brake-cylinder, a second pipe connection disposed in a lower plane and effecting a communication between the casing and reservoir, and a valve movable in the casing and having heads at opposite extremities and intermediate passage means for establishing communication with the reservoir and brake-cylinder.

10. In an air-brake system, the combination with a reservoir and a brake-cylinder, of a primary valve mechanism connected to said reservoir and cylinder and having a valve slidably mounted therein, and a secondary valve mechanism having a valve operative by the valve of the primary mechanism to open communication between said primary mechanism and the reservoir.

11. In an air-brake system, the combination with a reservoir and a brake-cylinder, of a primary valve mechanism having a sliding gravitating valve therein, and a secondary valve mechanism having a valve member operative by the valve of the primary mechanism and controlling communication of the latter with the reservoir, the said valve member being positioned to be forced to its seat by the air-pressure from the reservoir.

12. In a brake system, the combination with a reservoir and a brake-cylinder, of a primary valve mechanism having a sliding valve therein and connected to the reservoir and cylinder, means for supplying air to the bottom of the said mechanism, and a secondary valve mechanism having a valve operative by the valve of the primary mechanism and controlling communication of the latter with the reservoir, the said valve of the secondary mechanism being provided with a flexible flap which is forced against its seat by the air-pressure from the reservoir.

13. In a brake system, the combination with a reservoir and brake-cylinder, of a primary valve mechanism connected to the reservoir and brake-cylinder and provided with means for controlling the admission of air from the reservoir into the cylinder, a secondary valve mechanism having a valve operative to open position by the primary valve mechanism, and tubular connections between the secondary valve mechanism and the reservoir and the primary and secondary valve mechanisms.

14. In an air-brake system, the combination with a reservoir and a brake-cylinder, of a main valve mechanism connected to the cylinder and reservoir and having ports therein at different elevations to establish such connection, a secondary valve mechanism interposed between the reservoir and main valve mechanism, means for supplying air to the main valve mechanism for initially operating the latter previous to the admission of air thereto from the reservoir, and a pressure-regulating valve mechanism also interposed between the main valve mechanism and the reservoir.

15. In an air-brake system, the combination with an auxiliary reservoir, a main reservoir, a train-line having the usual pumping connections and controlling-valve, and a brake-cylinder, of a primary valve mechanism with upper and lower ports connected respectively to the said cylinder and auxiliary reservoir, said mechanism also having a reciprocating valve therein with an intermediate means for establishing communication between the ports, means for supplying air to the lower part of the valve mechanism from the train-line, and a secondary valve mechanism interposed between the auxiliary reservoir and the primary valve mechanism and having a valve member operative by the movement of the valve in the primary mechanism.

16. In an air-brake system, the combination with a reservoir, and a brake-cylinder, of a main-valve casing located in the line of communication between the reservoir and cylinder, said casing being provided with inlet and outlet ports located out of alinement and also with exhaust-ports communicating with the upper interior portion of the casing, a reciprocating valve in said casing having intermediate means for establishing communication between the said ports, the upper end of the valve being below the points of communication with the interior of the casing of the exhaust-ports, means for admitting air under pressure to one end of the casing to move the valve to its open position, and means for admitting air into the interior of the casing under the control of the said reciprocating valve.

17. In an air-brake system, the combination with a reservoir and a brake-cylinder, of a primary valve mechanism arranged in the line of communication between the reservoir and cylinder and including a casing having ports leading to the reservoir and cylinder and with exhaust-ports, and a reciprocating valve to establish communication between the said ports, a train-pipe communicating with the casing to supply fluid under pressure for moving the valve in one direction to set up communication between the reservoir and cylinder, and means for releasing the brakes and permitting the valve to be moved down to normal position by air-pressure.

18. In an air-brake system, the combination with a main reservoir, several auxiliary reservoirs, and several brake-cylinders, of means for storing air in the reservoirs, a pipe having communication with the main reservoir and with each of the auxiliary reservoirs, a primary valve-casing arranged in the line of communication between each auxiliary reservoir and its brake-cylinder, a train-line in communication with the several valve-casings, and reciprocating valves in the casings arranged to be moved by straight air-pressure to their open position to establish communication between the auxiliary reservoirs and brake-cylinders.

19. In an air-brake system, the combination with a main reservoir, an auxiliary reservoir, and a brake-cylinder, of a primary valve mechanism controlling communication between the auxiliary reservoir and the brake-cylinder, and means for directing straight air-pressure into the primary valve mechanism, against the valve in the latter to move it to its open position to establish communication between the auxiliary reservoir and the brake-cylinder to supply air from said auxiliary reservoir to the cylinder.

20. In an air-brake system, the combination with an auxiliary reservoir and a brake-cylinder, of a primary valve-casing having lower and upper ports respectively connected to the said reservoir and cylinder, and also provided with upper exhaust-ports, a reciprocating valve mounted in the said casing and having a lower enlarged extremity, means for supplying air to the lower part of the casing to initially operate the valve, and a secondary valve mechanism arranged in operative relation to the primary mechanism and controlling communication of the reservoir with the said primary mechanism, said secondary mechanism including a valve having a stem movable downwardly into the primary mechanism for engagement with the valve in the latter mechanism.

21. In an air-brake system, the combination with an auxiliary reservoir and a brake-cylinder, of a primary valve mechanism to control communication between the said reservoir and cylinder, and a secondary valve mechanism to control communication of the reservoir with the primary mechanism and comprising a stem movable into and actuated by the primary mechanism, said stem having a valve thereon with a flexible flap which is pressed to its seat by the air-pressure from the auxiliary reservoir.

22. In an air-brake system, the combination with a reservoir and a brake-cylinder, of means interposed between the reservoir and cylinder for controlling the supply of air to the cylinder, and a piston in the brake-cylinder having heads of different diameters with an intermediate reduced body to form an air-space, the said body having an air-passage extending therethrough and controlled by an outwardly-opening valve to permit a portion of the air for actuating the piston to pass into the said space to return the piston to normal position after the brakes are released.

23. In an air-brake system, the combination with a reservoir, a brake-cylinder, and means for controlling the supply of air from the reservoir to the cylinder, of a piston in the cylinder having an intermediate air-space, and means for permitting a part of the air for actuating the piston to pass through the latter into the space for utilization in restoring the piston to normal position when the brakes are released.

24. In an air-brake system, the combination with a reservoir, a brake-cylinder, and means for controlling communication between the reservoir and cylinder, of a piston in the cylinder having means for receiving air fed to the cylinder to return the piston to normal position when the brakes are released.

In testimony whereof I affix my signature in presence of two witnesses.

WILLIAM WILLIAMS.

Witnesses:
G. W. GARRETTSON,
H. B. DUNN.